US007158008B2

(12) United States Patent
Waring et al.

(10) Patent No.: US 7,158,008 B2
(45) Date of Patent: Jan. 2, 2007

(54) ELECTRONIC KEY SYSTEM AND METHOD

(75) Inventors: Gerry Waring, Bracknell (GB); Bill Stifle, Rogers, MN (US); David Mattis, Lakeville, MN (US)

(73) Assignee: Datakey Electronincs, Inc., Burnsville, MN (US)

( * ) Notice: Subject to any disclaimer, the term of this patent is extended or adjusted under 35 U.S.C. 154(b) by 399 days.

(21) Appl. No.: 10/112,989

(22) Filed: Mar. 29, 2002

(65) Prior Publication Data

US 2003/0184432 A1 Oct. 2, 2003

(51) Int. Cl.
*H04Q 9/00* (2006.01)

(52) U.S. Cl. ..................... 340/5.66; 340/5.67; 340/5.7; 340/5.72

(58) Field of Classification Search ............... 340/5.66, 340/5.67, 5.7, 5.72, 5.65, 825.31, 825.32; 70/413, 278.3, 278

See application file for complete search history.

(56) References Cited

U.S. PATENT DOCUMENTS 4,085,394 A 4/1978 Weisenburger ............... 336/20
4,176,782 A 12/1979 Fukuda et al. .............. 235/449
4,297,569 A 10/1981 Files .......................... 235/443
4,326,125 A 4/1982 Files .......................... 235/443
4,432,218 A 2/1984 Hoener ........................ 70/395
4,436,993 A 3/1984 Files .......................... 235/382
4,522,456 A 6/1985 Wehrmacher ............. 339/17 R
4,549,076 A 10/1985 Files .......................... 235/382
4,578,573 A 3/1986 Flies et al. .................. 235/492
4,620,088 A 10/1986 Files .......................... 235/443
4,631,943 A 12/1986 Hoener ........................ 70/395
4,659,915 A 4/1987 Flies .......................... 235/441
4,663,952 A 5/1987 Gelhard ........................ 70/278
D291,897 S 9/1987 Files ........................... D20/22
4,752,679 A 6/1988 Wehrmacher ............... 235/382
4,791,257 A 12/1988 Frey et al. .............. 200/159 R
5,073,703 A 12/1991 Wehrmacher ............... 235/492
5,157,244 A 10/1992 Mroczkowski et al. ..... 235/441
5,250,986 A 10/1993 Axten et al. ................ 335/206
D345,686 S 4/1994 Boehner ...................... D8/347
5,337,588 A 8/1994 Chhatwal
5,422,634 A 6/1995 Okubo .................. 340/825.34
5,507,162 A 4/1996 Chhatwal
5,526,662 A 6/1996 Diekoff et al.
5,625,349 A 4/1997 Disbrow et al.

(Continued)

FOREIGN PATENT DOCUMENTS

DE 36 20 755 A1 12/1987

(Continued)

OTHER PUBLICATIONS

Advanced Portable Information Products, *Datakey Brochure*, 1999.

(Continued)

*Primary Examiner*—Jeffery Hofsass
*Assistant Examiner*—Scott Au
(74) *Attorney, Agent, or Firm*—Dorsey & Whitny LLP

(57) ABSTRACT

The present invention provides an electronic key system including an electrical/electronic key-like device and an electrical/electronic key receptacle capable of receiving a contactless type, contact type, or both types of key-like devices. The present invention further provides an electronic key system including an electrical/electronic key-like device and an intelligent electrical/electronic key receptacle wherein the system is capable of performing a transaction between the key-like device and the key receptacle after the key-like device is inserted into the key receptacle and moved to a predetermined position.

16 Claims, 6 Drawing Sheets

U.S. PATENT DOCUMENTS

| | | | | |
|---|---|---|---|---|
| 5,685,182 | A | 11/1997 | Chhatwal | |
| 5,758,529 | A | 6/1998 | Chhatwal | |
| 5,831,520 | A | 11/1998 | Stephan | 340/457 |
| 5,836,187 | A | 11/1998 | Janssen et al. | |
| 5,841,637 | A | 11/1998 | Chhatwal | |
| 6,000,258 | A | 12/1999 | Lesko | 70/460 |
| 6,035,677 | A | 3/2000 | Janssen et al. | |
| 6,078,265 | A | 6/2000 | Bonder et al. | |
| 6,092,404 | A | 7/2000 | Chhatwal | |
| 6,227,019 | B1 | 5/2001 | Chhatwal | |
| 6,354,122 | B1 | 3/2002 | Snoke | |
| 6,384,709 | B1 | 5/2002 | Mellen et al. | |
| 6,425,084 | B1 * | 7/2002 | Rallis et al. | 713/185 |
| 6,486,793 | B1 * | 11/2002 | Buccola | 340/5.2 |
| 6,604,087 | B1 * | 8/2003 | Kolls | 705/14 |
| 2002/0025062 | A1 | 2/2002 | Black | |

FOREIGN PATENT DOCUMENTS

| | | |
|---|---|---|
| FR | 2 723 655 A1 | 2/1996 |

OTHER PUBLICATIONS

DataTic™ *Datakey Brochure*, 2000.

"2KBIT Read/Write with ANTICOLLISION Contactless Identification Device EM4056", *EM Microelectronic-Marin SA*, Informational Brochure, 13pgs., 2001.

"Read Only Contactless Identifiecation Device H4102", Swatch Group, 6pgs, 2000.

"Read/Write Transponder Device Family", ATMEL Wireless & μC, 2pgs, 2001.

"Read/Write IDIC Micromodule with 1 Kbit Memory T5552", ATMEL Wireless & μC, 12pgs, May 1, 2001.

"Standard R/W/ IDIC with Integrated Capacitance T5554", ATMEL Wireless & μC, 19pgs, Sep. 3, 2001.

"Multifunctional 330-bit Read/Write RF-Identification IC T5557", ATMEL, 24pgs, Dec. 11, 2001.

iDTAG, Gang Programmer for Datakey Key/Slim Modules (SPI, Microwire & IIC Bus), 6pgs, Nov. 29, 2001.

DataKey Guardian "Marina Access Control", *Datakey Brochure*, (2pgs), (*published prior to the filing date of the application*) Mar. 29, 2002.

DataKey QuikPay, DataKey Brochure (2pgs), (*published prior to the filing date of the application*) Mar. 29, 2002.

* cited by examiner

ELECTRONIC KEY SYSTEM AND METHOD

CROSS-REFERENCE TO RELATED APPLICATION(S)

None.

FIELD OF THE INVENTION

The present invention relates generally to an electronic information system. More particularly, the present invention relates to an electronic key system comprising an electrical/electronic key-like device and a key receptacle.

BACKGROUND OF THE INVENTION

Electronic key systems have been used in many applications and have proven to be a source for portable data solutions. For example, electronic key systems have been used in data logging applications wherein a portable electrical/electronic key-like device stores user and/or other information for transport of data to/from a remote station; in access control applications where a portable key-like device stores information to be verified by an access control program or system; in cashless vending or cash token applications wherein a portable electrical/electronic key-like device stores a value (e.g. cash value or number of credits, etc.) that is decremented after vending a product or being served, and can be recharged with additional value; and in security applications wherein a portable electrical/electronic key-like device stores personal identification information that is valid only when the electrical/electronic key-like device is being used by the owner or authorized personnel of the electrical/electronic key-like device.

Prior electronic key systems include an electrical/electronic key-like device and an electrical key receptacle as disclosed in U.S. Pat. No. 4,752,679, entitled "RECEPTACLE DEVICE", issued on Jun. 21, 1988; U.S. Pat. No. 4,659,915, entitled "RECEPTACLE DESIGN FOR USE WITH ELECTRONIC KEY-LIKE DEVICE", issued on Apr. 21, 1987; U.S. Pat. No. 4,522,456, entitled "ELECTRONIC TAG RECEPTACLE AND READER", issued on Jun. 11, 1985; U.S. Pat. No. 4,620,088, entitled "RECEPTACLE DESIGN FOR USE WITH ELECTRONIC KEY-LIKE DEVICE", issued on Oct. 28, 1986; U.S. Design Pat. No. Des. 345,686, entitled "ELECTRICAL INFORMATION KEY", issued on Apr. 5, 1994; U.S. Pat. No. 4,578,573, entitled "PORTABLE ELECTRONIC INFORMATION DEVICES AND METHOD OF MANUFACTURE", issued on Mar. 25, 1986; U.S. Pat. No. 4,549,076, entitled "ORIENTATION GUIDE ARRANGEMENT FOR ELECTRONIC KEY AND RECEPTACLE COMBINATION", issued on Oct. 22, 1985; U.S. Pat. No. 4,436,993, entitled "ELECTRONIC KEY", issued on Mar. 13, 1984; U.S. Pat. No. 5,073,703, entitled "APPARATUS FOR ENCODING ELECTRICAL IDENTIFICATION DEVICES BY MEANS OF SELECTIVELY FUSIBLE LINKS", issued on Dec. 17, 1991; U.S. Design Pat. No. Des. 291,897, entitled "IDENTIFICATION TAG", issued on Sep. 15, 1987; U.S. Pat. No. 4,326,125, entitled "MICROELECTRONIC MEMORY KEY WITH RECEPTACLE AND SYSTEMS THEREFOR", issued on Apr. 20, 1982; and U.S. Pat. No. 4,297,569, entitled "MICROELECTRONIC MEMORY KEY WITH RECEPTACLE AND SYSTEMS THEREFOR", issued on Oct. 27, 1981; all of which are assigned to Datakey Electronics, Inc., the assignee of the present application, and all of which are incorporated herein by reference.

The above referenced electronic key systems disclose electrical/electronic key-like devices and receptacles. In general, an outside circuit or electrical operation system is activated by use of a portable key-like device which is inserted into a receptacle or the like, to make electrical contact or connection with the outside circuit or the electrical operation system. Such electrical contact or connection is generally made by rotating a key-like device after the device is fully inserted into a receptacle, whereby a plurality of spring contact pins of the receptacle mate with contacts of the key-like device. Electrical pathways or wires/traces in the receptacle electrically connect the spring contact pins to an interface of the receptacle. The interface carries electrical signals from the key-like device to the outside circuit or electrical operation system.

It has been noted that the contacts of the key-like device and the receptacle are subject to wear and tear not only because of the mechanical contact, but also because the contacts of a key-like device are exposed to an outside environment without protection. Therefore, it is desirable to have a contactless electronic key system.

Further, it is desirable to have a receptacle that is capable of receiving contactless or both contact and contactless key-like devices. Also, it is desirable to have an intelligent receptacle which is capable of performing a transaction between the key-like device and the receptacle, for example, providing embedded functional applications using a key-like device and providing an interface between the key-like device and an outside operation system.

Accordingly, there is a need for an improved electronic key system.

SUMMARY OF THE INVENTION

To solve the above and the other problems, in one embodiment, the present invention provides an electronic key system comprising a key-like device and an intelligent receptacle. In some embodiments, the key may be a contactless key; and in other embodiments, the key may be a contact key. For a contactless key-like device, the contacts are within or covered by a housing or enclosure which eliminates the problem of exposure of contacts to an outside environment. The intelligent receptacle of the present invention is capable of receiving both contact and contactless key-like devices. Also, in some embodiments, the intelligent receptacle of the present invention includes a circuit for embedded functional applications and an interface between the key-like device and an external operation system.

In one embodiment of the present invention, an electronic key system comprises an electrical/electronic key-like device; and a key receptacle for receiving the electrical/electronic key-like device. The key receptacle includes a housing having an opening configured and arranged to receive the electrical/electronic key-like device, the opening having an inside end and an outside end; a circuit mounted in the housing, the circuit having at least one electrical trace and at least one embedded application operable with the electrical/electronic key-like device; and in the case of contactless, a transceiver antenna member disposed proximate the inside end of the opening or a suitable position along the opening.

In one embodiment, the electrical/electronic key-like device is a contactless electrical/electronic key-like device. The contactless electrical/electronic key-like device comprises a generally key-like enclosure having a distal end and a proximal end; a circuit disposed in and supported by the enclosure; and a magnetic coupling member disposed in the enclosure proximate the distal end of the enclosure or a suitable position inside the enclosure. In some embodiments, the enclosure is molded plastic, but other materials and suitable forming methods may be used as well. In some embodiments, the circuit and the magnetic coupling member are contained substantially or completely within the enclosure, i.e. are not exposed to an outside environment.

In one embodiment, when the key-like device is inserted into the opening, the magnetic field of the magnetic coupling member is disposed substantially orthogonal to the magnetic field of the transceiver antenna member. There is no coupling between the magnetic field, and there is no transaction between the key-like device and the key receptacle. When the key-like device is fully inserted into the receptacle and turned to a predetermined position at which the magnetic field of the magnetic coupling member and the magnetic field of the transceiver antenna member are substantially aligned with each other, the magnetic field of the magnetic coupling member is coupled to the magnetic field of the transceiver antenna member so as to enable a transaction between the circuit of the key-like device and the circuit of the key receptacle.

In some embodiments, when the key-like device is turned into a predetermined position, such as the predetermined position mentioned in the immediately proceeding paragraph, a feedback, such as a tactile, audible, or visual feedback, is generated. The key-like device is configured in a shape, such as a cylindrical shape, such that it prevents devices which do not physically “fit” from being inserted and turned into the predetermined position.

In another embodiment of the present invention, the electrical/electronic key-like device includes a key-like enclosure having a distal end and a proximal end and at least one groove disposed on each side of the enclosure between the distal end and the proximal end; a circuit disposed in and supported by the enclosure; and at least one electrical contact electrically connected to the circuit via at least one trace, the at least one electrical contact being disposed in the corresponding groove and exposed to the outside environment.

In another embodiment, the key receptacle further includes a plurality of contact pins. The contact pins make contact with the electrical contacts of the key-like device when the key-like device is fully inserted into the opening of the key receptacle and turned to a predetermined position.

The present invention further provides a method of operating an electronic key system. In one embodiment, the method includes the steps of providing an electrical/electronic key-like device, the electrical/electronic key-like device storing information and having a first circuit; inserting the electrical/electronic key-like device into a key receptacle, the key receptacle having a second circuit; moving the electrical/electronic key-like device into a predetermined position with respect to the key receptacle to enable a transaction between the first circuit of the electrical/electronic key-like device and the second circuit of the key receptacle.

In one embodiment, the transaction is a data logging operation to read/write data between the key-like device and the key receptacle for transport of data to/from a remote station.

In another embodiment, the transaction is an access control operation to verify data stored in the key-like device and provide access to an external operation system that the key receptacle is interfaced with.

In yet another embodiment, the transaction is a vending operation whereby the data stored in the key-like device is an amount of value (e.g. cash value or number of credits, etc.) and is decremented after each vending operation.

In yet an additional embodiment, the transaction is a cash token recharging operation whereby the data stored in the key-like device is increased by an amount of value.

One advantage of the present invention is that the contactless key-like device does not have contacts or other electronics exposed to the environment, and wear and tear on the contacts are thus substantially reduced.

Another advantage of the present invention is that the contactless system allows the electrical components/electronics to be sealed against corrosion, such as galvanic decay, or other hostile environments, such as salt air/spray or chemicals, etc.

A further advantage of the present invention is that the key receptacle is capable of receiving both contact and contactless types of key-like device, such that it allows for continued use of existing contact type of key-like devices.

Yet another advantage of the present invention is that the key receptacle is intelligent so that an external reader/writer or other hardware device can be eliminated. Additional functions can also be programmed on the circuit of the key receptacle.

These and other advantages of the present invention will become apparent to those skilled in the art from the following detailed description, wherein is shown and described illustrative embodiments of the invention, including best modes contemplated for carrying out the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION OF THE PREFERRED EMBODIMENTS

The present invention provides an electronic key system having an electrical/electronic key-like device and an intelligent key receptacle, wherein the system is capable of performing a transaction between the electrical/electronic key-like device and key receptacle after the electrical/electronic key-like device is inserted into the key receptacle and moved to a predetermined position. In some embodiments, the key receptacle is capable of functionally receiving either a key-like device with exposed contacts or a key-like device with embedded circuits which are not exposed.

Figure 1:
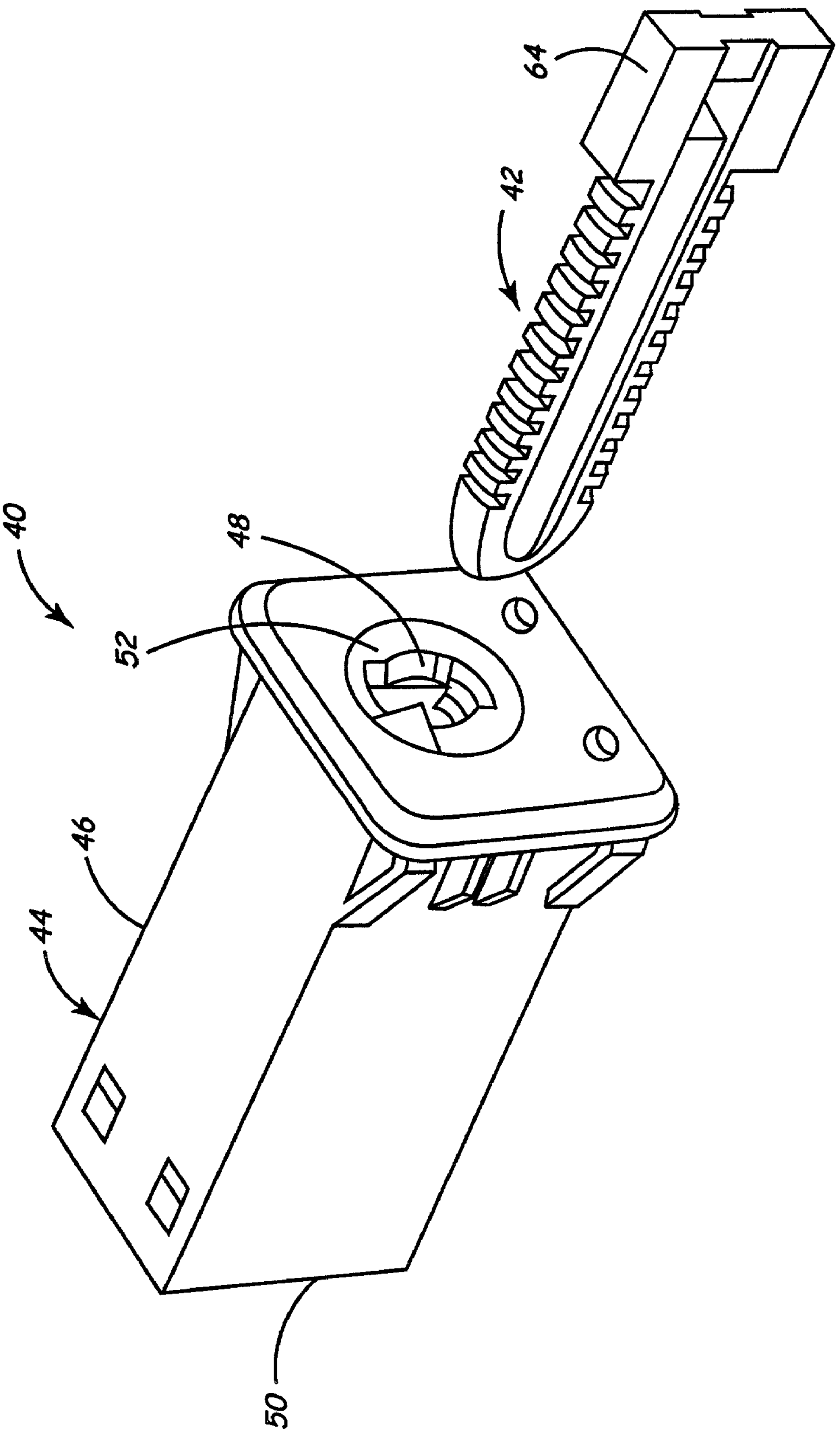
FIG. 1 is a pictorial exploded view of one embodiment of an electronic key system in accordance with the principles of the present invention.

FIG. 1 illustrates one embodiment of an electronic key system 40 in accordance with the principles of the present invention. The system 40 includes an electrical/electronic key-like device generally designated 42 and referred to hereinafter simply as the “key”, and a key receptacle generally designated 44. FIG. 1 is a pictorial view of one embodiment of the key system 40. The key 42 can be a contactless type of key or a contact type of key. In the present invention, the term “contactless key” is intended to encompass key-like devices having electrical contacts or other electronics wherein the electrical contacts or other electronics of the key do not physically contact the electrical contacts or electrical components of the key receptacle. The term “contact key” is intended to encompass key-like devices having electrical contacts or components wherein at least some of the electrical contacts or components of the key-like device physically contact electrical components of the key receptacle. Contact type of keys have been disclosed in prior patents, such as U.S. Pat. No. 4,752,679, mentioned herein above, and incorporated herein by reference. The description hereinafter will be, therefore, focused on contactless type of keys.

Also, it is appreciated that the electronic key system of the present invention is not limited by the term “key” or its definition. The system of the present invention may also be referred to as an electronic lock or locking system, data logging system, cashless vending system, data decrementing system, or data access control system, etc. For simplification and explanation, the system 40 described below is referred to as “electronic key system”.

Figure 8:
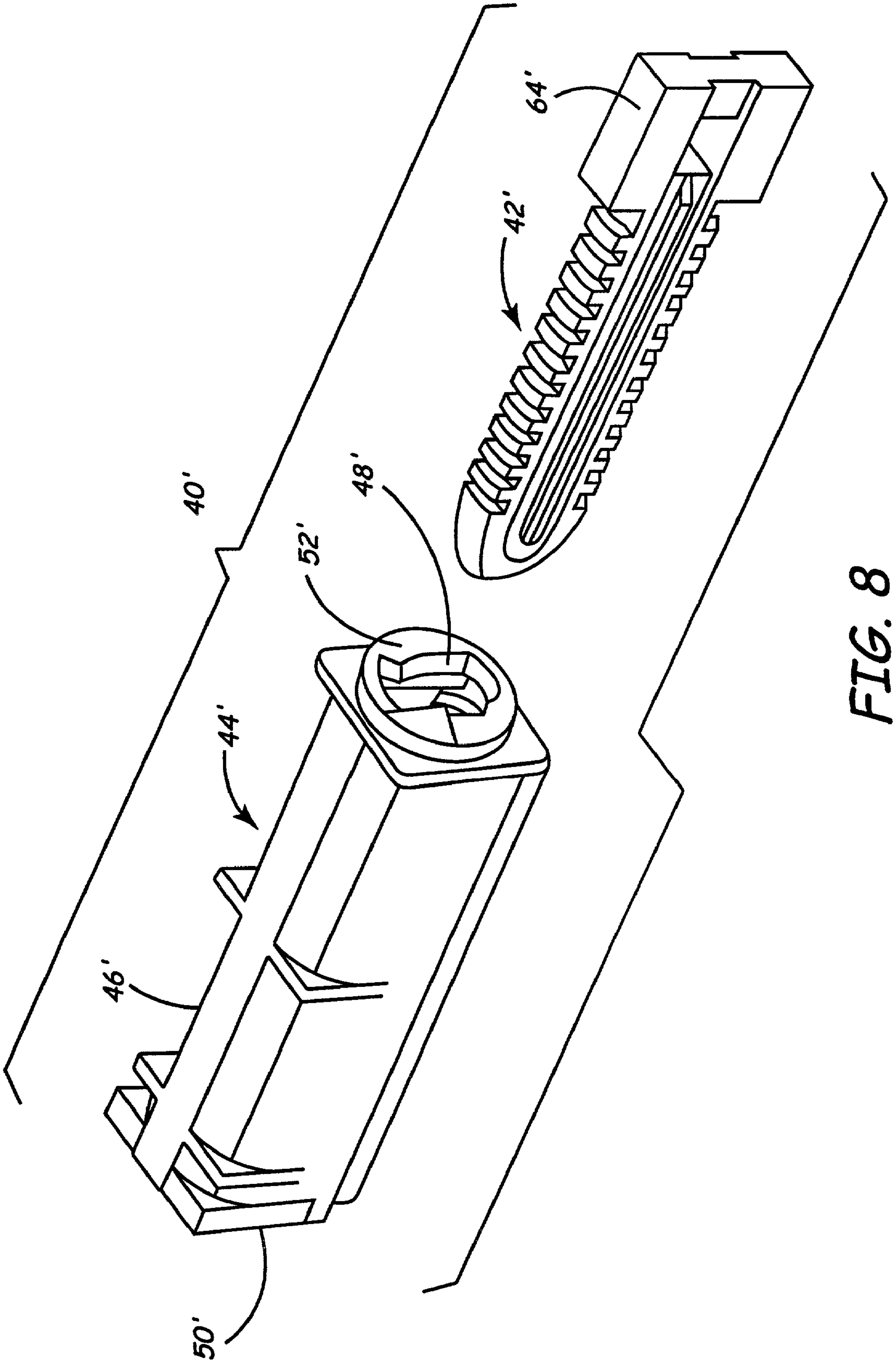
FIG. 8 is a pictorial exploded view of another embodiment of an electronic key system in accordance with the principles of the present invention.

The system 40 shown in FIG. 1 is a panel mount type of electronic key system. The body of the key receptacle 44 is generally inserted into a structure, such as a panel. It is appreciated that the key receptacle can be mounted on other types of structure, such as a circuit board. FIG. 8 illustrates one embodiment of a board mount type of electronic key system 40' wherein the parts are designated by the same reference numerals except with a prime symbol.

Still referring to FIG. 1, the key receptacle 44 includes a housing 46 having a slot or opening 48 configured and arranged to receive the key 42. The opening 48 has an inside end 50 (shown in FIGS. 6 and 7) and an outside end 52.

Figure 2A:
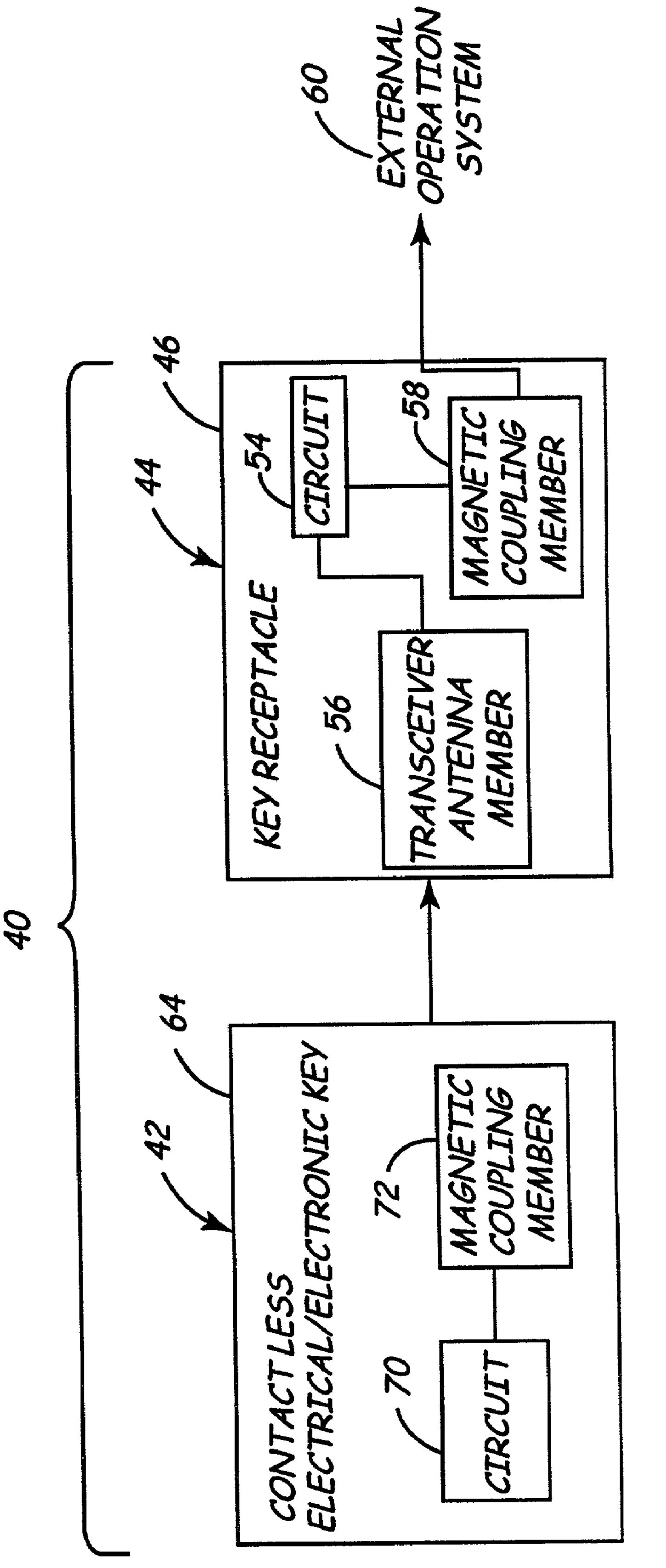
FIG. 2A is a functional block diagram of one embodiment of a contactless electronic key system having an intelligent key receptacle in accordance with the principles of the present invention.
Figure 2B:
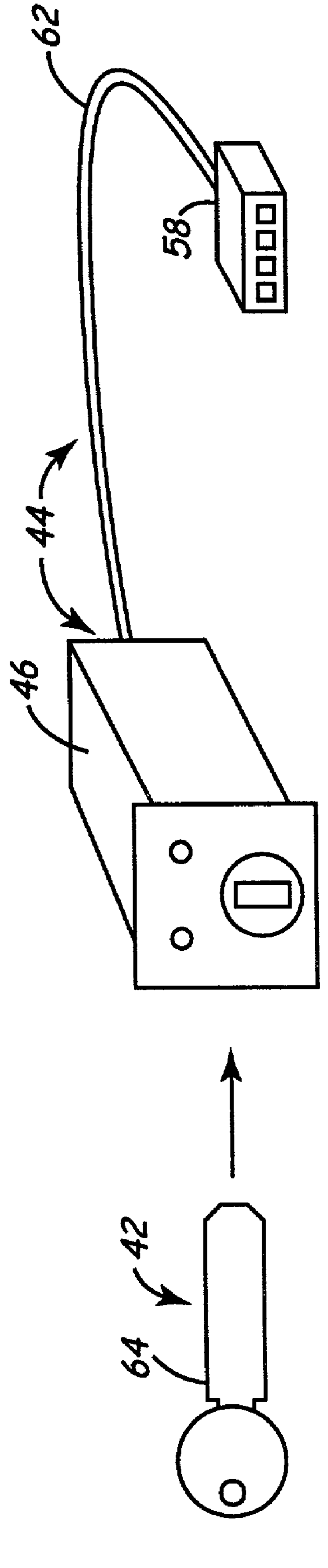
FIG. 2B is a pictorial view of one embodiment of the electronic key system having an intelligent key receptacle of FIG. 2A.

As shown in FIGS. 2A and 2B, the key receptacle 44 also includes a circuit 54. The circuit 54 is configured and arranged to be mounted in the housing 46. The circuit 54 includes electrical traces or pathways, a processor (e.g. a suitable CPU), and at least one embedded application, addressable I/O lines and/or communication bus/interface, that are operable with the electrical/electronic key-like device. The CPU, addressable I/O lines, and electrical traces or pathways can be any suitable CPU, addressable I/O lines and/or communication bus/interface, and electrical wires known in the electrical and computer art. The at least one embedded application can be any type of user application, such as reader/writer modules, etc., that are known in the electrical and computer art.

Figure 6:
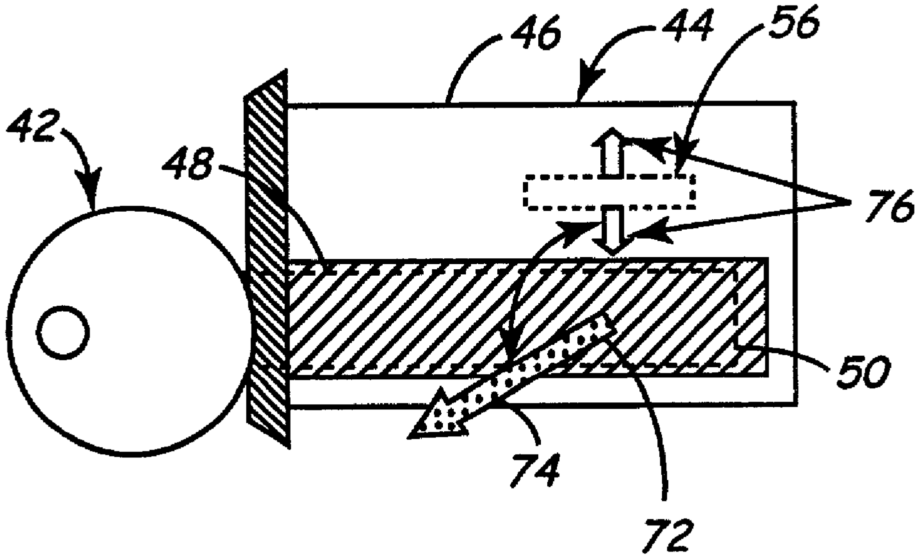
FIG. 6 is a schematic side view of one embodiment of the electrical/electronic key-like device that is inserted into the key receptacle and disposed in a non-activated state.
Figure 7:
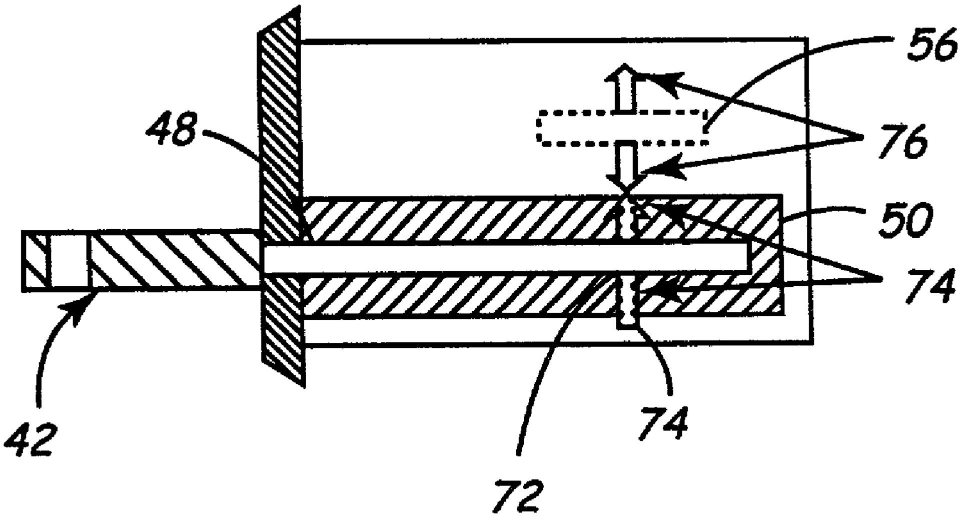
FIG. 7 is a schematic side view of one embodiment of the electrical/electronic key-like device that is inserted into the key receptacle and disposed in an activated state.

The key receptacle 44 further includes a transceiver antenna member 56. The transceiver antenna member 56 is disposed in the housing 46 near the inside end 50 of the opening 48 as shown in FIGS. 6 and 7.

Also as shown in FIGS. 2A and 2B, in some embodiments, the key receptacle 44 may include an interface 58 for interfacing an external operation system 60. As shown in FIG. 2A, the interface 58 is disposed within the housing 46. It should be appreciated that the interface 58 can also be disposed outside the housing 46 and electrically connected to the circuit 54 of the receptacle 44 via wires, electric cords 62 or other equivalent means.

Figure 3:
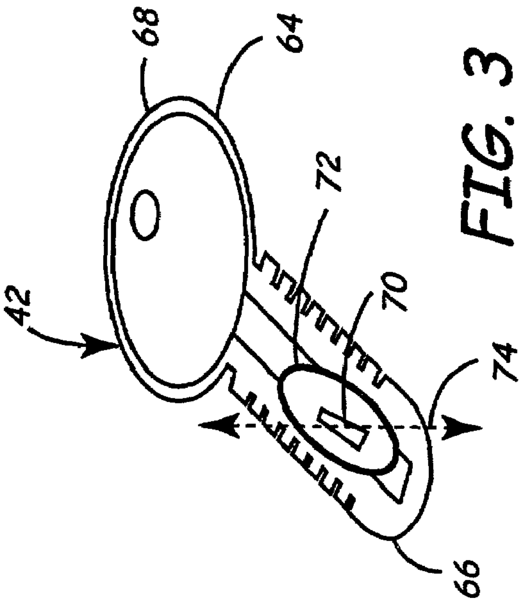
FIG. 3 is a pictorial perspective view of one embodiment of an electrical/electronic key-like device in accordance with the principles of the present invention.

The interface 58 may provide a standard interface protocol, such as RS-232, RS-485, etc., at least one input/output line, and power/ground. It should be appreciated that the interface 58 may provide other types of interface protocols, such as wireless communications, MDB (Multiple Drop Bus), USB (Universal Serial Bus), etc., without departing from the scope of the present invention. By using the standard RS-232 interface protocol, the system significantly speeds up the integration cycle and eliminates chip-level interfacing, which is one of the advantages over the earlier systems. This eases the migration to new key technologies and applications and handling of sophisticated memory security algorithms. By using the standard RS-485 interface protocol, the system not only provides the above advantages, but also provides Daisy Chain networking with relatively inexpensive twisted pair cables and long range communications (up to 1 km or more with repeaters). By using RS-485 interface protocol, the system also allows each receptacle to have a unique, programmable ID and provides access to the at least one remotely addressable logic-level outputs in case of multiple receptacle systems/configurations FIG. 3 illustrates one embodiment of the contactless key 42 in accordance with the principles of the present invention. Key 42 includes a non-conductive key-like or generally key-shaped enclosure 64 (which may also be thought of and referred to as the “body” of the key 42) having a distal end 66 and a proximal end 68. The key 42 is configured and arranged for insertion into the opening 48 of the key receptacle 44 as shown in FIGS. 4–5 and 6–7.

With further reference to FIGS. 3 and 2A, the key 42 includes a circuit 70 disposed in and supported by the enclosure 64. The circuit 70 may be configured the same as a circuit in contact type of keys disclosed in prior patents, such as the keys of U.S. Pat. Nos. 4,752,679 and 4,578,573 mentioned above, and incorporated herein by reference. For example, the contactless or contact type of key may include a non-volatile, re-programmable memory.

Also as shown in FIG. 3, the key 42 may include a magnetic coupling member 72 disposed in the enclosure 64 near the distal end 66 of the enclosure 64. It should be appreciated that the member 72 may be located anywhere suitable with respect to the key 42.

In one exemplary implementation of the circuit 54, the transceiver antenna member 56, the circuit 70, and the magnetic coupling member 72, a suitable integrated circuit, such as model EM4056, made by EM Microelectronic-Marin SA, can be used in accordance with the principles of the present invention. The EM4056 product/data information can be found on EM Microelectronic-Marin SA’s website, at www.emmicroelectronic.com, which is incorporated herein by reference.

Figure 4:
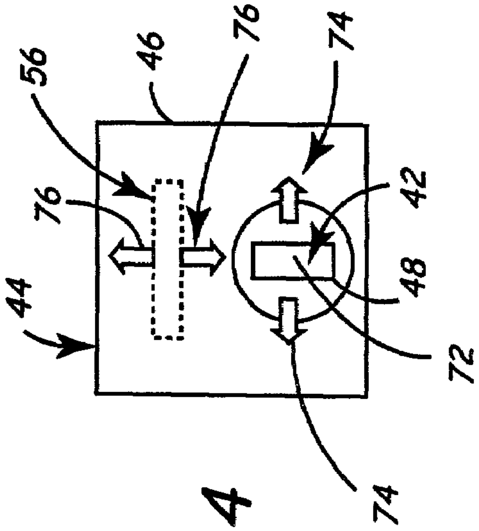
FIG. 4 is a schematic end view of one embodiment of the electrical/electronic key-like device that is inserted into a key receptacle and disposed in a non-activated state.
Figure 5:
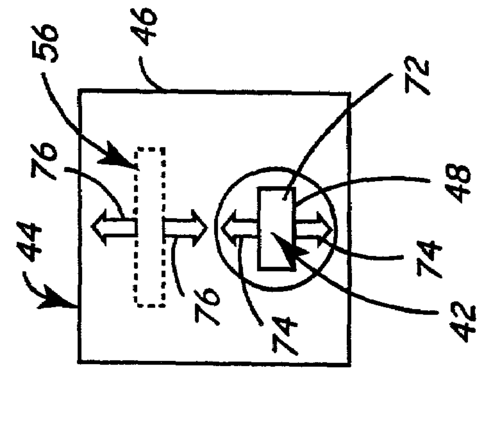
FIG. 5 is a schematic end view of one embodiment of the electrical/electronic key-like device that is inserted into the key receptacle and disposed in an activated state.

FIGS. 4 and 6 illustrate that, in use, the key 42 is fully inserted into the opening 48 whereby the distal end 66 of the key 42 is disposed at or adjacent to the inside end 50 of the opening 48. The magnetic coupling member 72 is disposed adjacent to the transceiver antenna member 56. As shown, the magnetic field 74 of the magnetic coupling member 72 is orthogonal to the magnetic field 76 of the transceiver antenna member 56. No energy is coupled between the magnetic field 74 and the magnetic field 76. Once the key 42 is turned a certain amount, such as 90° degrees, to a predetermined position, the magnetic field 74 of the magnetic coupling member 72 and the magnetic field 76 of the transceiver antenna member 56 are substantially aligned with each other and are fully coupled. RF signals forming a communication pathway are thus generated in the transceiver antenna member 56 to enable a transaction between the circuit 70 of the key 42 and the circuit 54 of the receptacle 44.

The position at which the key 42 is capable of generating sufficient energy is predetermined by the mechanical alignment between the key 42 and the receptacle 44 and by the distance between the alignment of the magnetic fields 74 and 76. Accordingly, a key external to the panel in which the receptacle 44 is mounted cannot "talk" with the transceiver antenna member 56, i.e., not enough energy is coupled or flows between the magnetic coupling member 72 and the transceiver antenna member 56. This prevents "accidental" or "casual" activation by authorized keys and also prevents those keys that do not conform with the mechanical alignment of the receptacle, i.e. unauthorized keys, from becoming active or causing false triggering.

In some embodiments, the key 42 and the key receptacle 44 are configured and arranged such that a tactile feedback is generated when the key-like device is turned into the predetermined position. Other types of feedback can also be generated within the scope of the present invention, for example, an audible feedback by a buzzer or a visible feedback by a LED.

As shown in FIG. 6, the key 42 may be inserted in a vertical direction and turned to a horizontal direction to activate a transaction. It should be appreciated that the key can be arranged such that it can be inserted and turned in other directions to activate a transaction without departing from the scope of the present invention.

The enclosure 64 of the key 42 is preferably molded plastic. The circuit 70 and the magnetic coupling member 72 are housed inside the enclosure 64 and are not exposed to the outside environment. Accordingly, key detection and communication of the present invention are performed without physical contact between the electrical components/electronics of the key and the electrical components/electronics of the key receptacle. This substantially reduces the wear and tear on the key and the key receptacle. Another advantage is that the contactless system allows the electrical components/electronics to be sealed against corrosion, such as galvanic decay, or other hostile environments, such as salt air/spray or chemicals, etc.

To operate an electronic key system in accordance with the present invention, a user simply fully inserts a key into a key receptacle and turns the key to a predetermined position to enable a transaction between the key and the key receptacle. In some embodiments, a user will feel a feedback when the key is turned to this predetermined position. In other embodiments, a user simply inserts a key into a key receptacle until the user senses a feedback, in which case no rotation of the key is necessary.

The present invention can be used in many applications, for example, a data logging application for transport of data to/from a remote station, an access control application, and a cashless vending operation, etc. In a data logging operation, the system reads/writes information from/to the key, and the user transports data to/from a remote station via a key receptacle. In an access control operation, the system determines whether the key is one of the permitted keys. If so, the system outputs logic command, such as a user-specified length of time, etc. This application can be used for locks and gates, etc. In a cashless vending operation, the system stores an amount of value (e.g. cash value, or number of credits, etc.) on the key and decrements the value on the key after each vending operation. Once the cash is used up, additional cash can be recharged onto the key in a similar operation. During a cashless vending operation, a user and/or the system may also activate a dispenser, open a control, and activate the control for a length of time.

Although the present invention has been described with reference to preferred embodiments, persons skilled in the art will recognize that changes may be made in form and detail without departing from the spirit and scope of the invention.

What is claimed is:

1. An electronic key system, comprising:

a key device having a key housing, a circuit and an electromagnetic coupling member enclosed in the key housing;

a key receptacle having a circuit and a transceiver antenna member disposed therein; and wherein the key system is activated for a transaction by inserting the electromagnetic coupling member of the key device into the key receptacle, aligning the electromagnetic coupling member of the key device with the transceiver antenna member of the key receptacle by orienting the key device to a predetermined position without physical contact between the circuit of the key device and the circuit of the key receptacle.

2. The system of claim 1, wherein the key housing has a distal end and a proximal end and at least one notch disposed between the distal end and the proximal end, the electromagnetic coupling member is disposed proximate the distal end of the key housing.

3. The system of claim 2, wherein the key receptacle comprises:

a key receptacle housing having an opening configured and arranged to receive and retain the key device;

the second circuit disposed inside and supported by the key receptacle housing; and the transceiver antenna member disposed inside and supported by the key receptacle housing.

4. The system of claim 3, wherein when the key device is inserted into the opening, electromagnetic field of the electromagnetic coupling member is disposed substantially orthogonal to electromagnetic field of the transceiver antenna member, and insufficient energy is coupled between the electromagnetic field of the electromagnetic coupling member and the electromagnetic field of the transceiver antenna member, so that the transaction of the key system is not enabled.

5. The system of claim 4, wherein when the key device is fully inserted into the key receptacle and turned to and retained at the predetermined position where the electromagnetic field of the electromagnetic coupling member and the electromagnetic field of the transceiver antenna member are substantially aligned with each other, sufficient energy is coupled between the electromagnetic field of the electromagnetic coupling member and the electromagnetic field of the transceiver antenna member, so that the transaction of the key system is enabled.

6. The system of claim 1, wherein when the key device is turned into the predetermined position, a tactile feedback is generated.

7. The system of claim 1, wherein when the key device is turned into the predetermined position, an audible feedback is generated.

8. The system of claim 1, wherein when the key device is turned into the predetermined position, a visual feedback is generated.

9. The system of claim 3, wherein the second circuit of the key receptacle comprises an interface for interfacing an external operation system.

10. The system of claim 9, wherein the interface includes a RS-232 protocol.

11. The system of claim 9, wherein the interface includes a RS-485 protocol.

12. The system of claim 9, wherein the interface includes a USB protocol.

13. A method of operating an electronic key system, comprising the steps of:

providing a key device, the key device storing information and having a key housing, a first circuit and an electromagnetic coupling member enclosed in the key housing;

providing a key receptacle, the key receptacle having a second circuit and a transceiver antenna member disposed therein;

inserting the electromagnetic coupling member of the key device into the key receptacle; and activating a transaction by orienting the key device to a predetermined position without physical contact between the first circuit of the key device and the second circuit of the key receptacle.

14. The method of claim 13, wherein the transaction is a data logging operation to read/write data between the key device and the key receptacle for transport of data.

15. The method of claim 13, wherein the transaction is an access control operation to verify data stored in the key device and provide access to an external operation system.

16. The method of claim 13, wherein the transaction is a vending operation whereby the data stored in the key device is an amount of value and is decremented after each vending operation.

* * * * *